US006863029B1

(12) United States Patent
Neufelder

(10) Patent No.: US 6,863,029 B1
(45) Date of Patent: Mar. 8, 2005

(54) TRAILER

(76) Inventor: Donald Neufelder, 51681 Harvester Dr., Granger, IN (US) 46530

(*) Notice: Subject to any disclaimer, the term of this patent is extended or adjusted under 35 U.S.C. 154(b) by 6 days.

(21) Appl. No.: 10/600,968

(22) Filed: Jun. 20, 2003

(51) Int. Cl.$^7$ ............................................. B60P 3/04
(52) U.S. Cl. ................................................... 119/414
(58) Field of Search .................... 294/24.31, 24.4, 294/24.41, 155; 410/129, 130, 132, 133, 135, 141, 142; 119/414, 400, 405, 412

(56) References Cited

U.S. PATENT DOCUMENTS

| | | | | |
|---|---|---|---|---|
| 2,331,197 A | * | 10/1943 | Johnston | 410/130 |
| 2,866,419 A | * | 12/1958 | Candlin, Jr. | 410/135 |
| 2,978,994 A | * | 4/1961 | Miller | 410/135 |
| 3,017,842 A | * | 1/1962 | Nampa | 410/133 |
| 3,070,044 A | * | 12/1962 | Tobin | 410/134 |
| 3,413,932 A | * | 12/1968 | Bennett | 410/142 |
| 3,741,529 A | * | 6/1973 | Blagg | 256/26 |
| 4,094,546 A | * | 6/1978 | Glassmeyer et al. | 296/24.4 |
| 4,498,824 A | * | 2/1985 | Kinkle | 410/121 |
| 4,639,031 A | * | 1/1987 | Truckenbrodt | 296/24.41 |
| 4,842,459 A | * | 6/1989 | Jensen et al. | 410/97 |
| 4,878,635 A | * | 11/1989 | Nordstrom | 244/137.1 |
| 5,788,439 A | * | 8/1998 | Duffell | 410/138 |
| 5,887,928 A | * | 3/1999 | Fenske | 296/24.31 |
| 6,261,038 B1 | * | 7/2001 | Cowan | 410/94 |
| 6,477,985 B1 | | 11/2002 | Mennenga et al. | 119/512 |
| 6,514,022 B2 | * | 2/2003 | Truckor et al. | 410/138 |
| 6,537,016 B2 | * | 3/2003 | Bonsall | 414/537 |
| 6,626,625 B2 | * | 9/2003 | Nelson et al. | 410/130 |

OTHER PUBLICATIONS

2002, Merhow Industries -Add.
Apr. 2003, Southern Horseman Press release.

* cited by examiner

Primary Examiner—Thomas Price
(74) Attorney, Agent, or Firm—Leo H McCormick, Jr.

(57) ABSTRACT

A trailer having a floor with first and second sidewalls covered by a roof to define an enclosed structure. The floor is divided by a plurality of ramped gates that are retained in first and second rails defined by a series of vertical sections that are connected through splitter section to a series of horizontal section. Vertical sections of the first rail are offset from the vertical sections of the second rail. A first roller assembly for a gate is retained in the first rail while a second roller assembly is retained in the second rail. On entry to the enclosed structure through a rear door, a gate is moved from a stored horizontal position to a vertical position to create an individual ramped stall while the gate is moved from the vertical position and returned to the stored position to allow egress through a forward door.

11 Claims, 2 Drawing Sheets

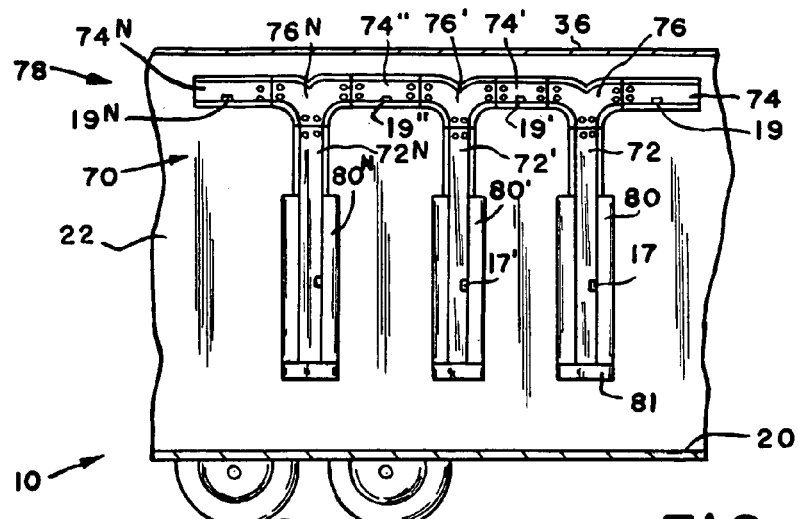
FIG. 3
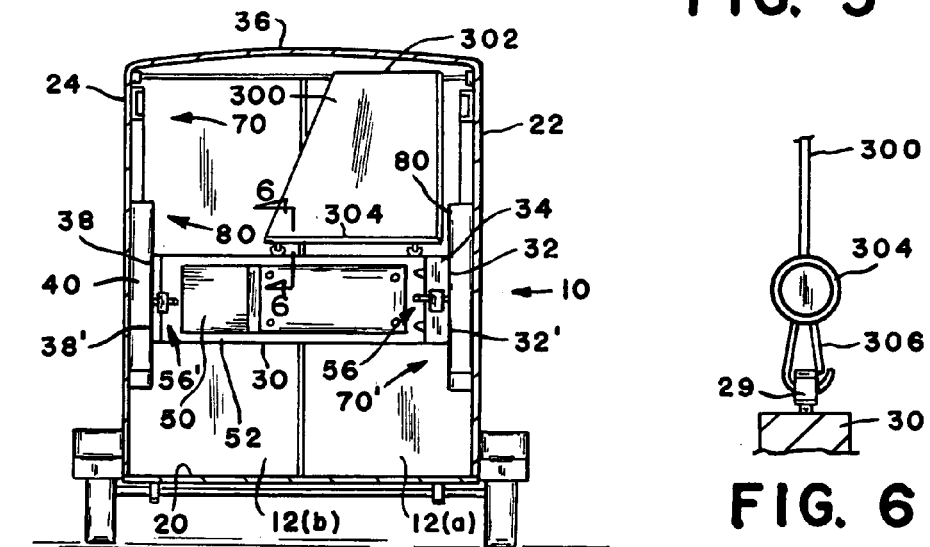
FIG. 4
FIG. 6
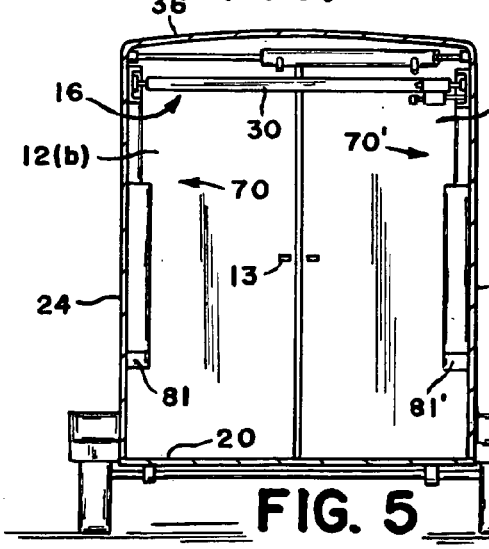
FIG. 5
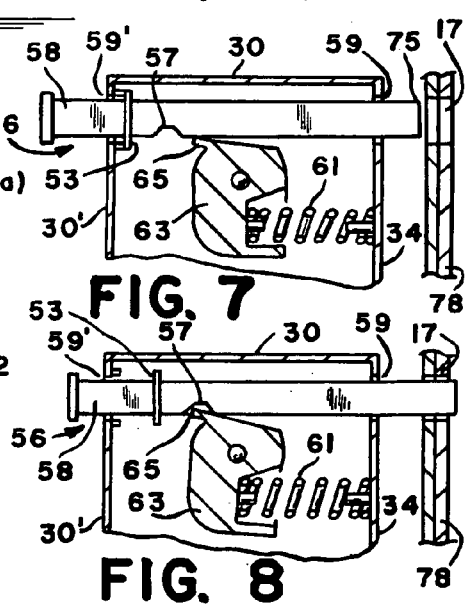
FIG. 7
FIG. 8

TRAILER

This invention relates to a trailer for transporting a plurality of animals whereby ingress to the trailer of each animal is through a rear door and egress for the animal may be though a forward door such that an animal is not required to step backwards.

BACKGROUND OF THE INVENTION

Transportation of animals from one location to another location is often achieved by a trailer that is towed by a truck. Trailers that are large enough to transport several animals most often have addition space to store equipment associated with the care and use of such animals. In the transpiration of multiple animals, It has been found that the stability of the trailer is enhanced when a uniform weight distribution of the animals occurs and more particularly when ramped stalls as disclosed in U.S. Pat. No. 6,477,985 are created in the trailer. In a trailer with ramped stalls, animals are sequentially placed in the trailer through a rear door and moved to a stall where a gate that is pivotally attached to one side wall is rotated and secured to a second wall. Animals may be loaded into the trailer until all of the stalls in the trailer are filled and the rear door thereafter closed. Once a destination is reached and it is desired to unload an animal, the rear door is opened and an animal must thereafter back out of the trailer as there is not enough space for an animal to turn around. Since the animal can not see where it is stepping, an animal is often under stress and as a result the animal can become agitated. Over a period of time an animal may become accustom to this type loading procedure but an animal may never completely overcome the stress associate in backing out of a trailer. This type trailer arrangement is deemed undesirable should the rear door become damaged and unable to be opened by an operator. Fortunately, trailers may be equipped with a second door that is located adjacent a first or front stall. Unfortunately, this second door is only accessible to the front stall and while it is possible to remove an animal from this front stall animals in adjacent stalls can not exit through this second door as the dividers can not be moved a sufficient distance as an animal blocks the pivotal rotation necessary for a second animal to exit from the second stall through such second door.

It has been suggested that the stress caused by backing back an animal off a trailer could be solved through the use of a swivel tongue arrangement such as included in a trailer manufactured by Tongue Twisters. While the swivel tongue arrangement would allow an animal to be removed from the trailer by walking forward, it requires an operator to rotate the trailer with respect to the hitch while animals located in the trailer and this alone may induce stress in the animal. In addition, the swivel structure adds significant structural weight to the trailer.

SUMMARY OF THE INVENTION

A primary object of the present invention is to provide a trailer wherein each animal in a multiple animal trailer enters through a rear door and may exit through a front door.

According to this invention, a trailer has a floor with sidewalls that extend therefrom and a roof that is attached to the sidewalls to define an enclosed structure. The enclosed structure has a rear door that pivots on one of the sidewall to allow an animal to enter the floor and a forward door that is located in at least one of the side walls. The floor is divided into a plurality of stalls by gate assemblies. Each gate in the plurality of gate assemblies has first and second rollers that are respectively retained in first and second rails attached to the walls. Each gate is movable from a horizontal position adjacent the roof to a vertical position adjacent the floor after an animal enters the enclosed structure through said rear door to create a corresponding individual stall for the animal. When it is desired to unload an animal, the front gate and each gate thereafter is moved from the vertical position and returned to the horizontal position to eliminate the individual stalls so that an animal may exit from the enclosed structure through said forward door.

An advantage of this invention resides in a trailer having a plurality of separators that are moved from a stored horizontal position adjacent a roof to a vertical position adjacent a floor to divide the interior thereof into a corresponding plurality of stalls for animals.

A still further advantage of this invention resides in a trailer wherein all animals may enter and leave a trailer by walking in a forward direction.

BRIEF DESCRIPTION OF THE DRAWINGS

FIG. 3 is a plan view taken along lines 3—3 of FIG. 2.

FIG. 4 is a plan view taken along lines 4—4 of FIG. 2 showing a gate in a vertical position.

FIG. 5 is a plan view taken along lines 4—4 of FIG. 2 showing a gate in a horizontal position.

FIG. 6 is an enlarged view of an attachment for a curtain as illustrated in FIG. 4;

FIG. 7 is an enlarged view of a locking mechanism for the gate in a released position;

FIG. 8 is an enlarged view of the locking mechanism of FIG. 7 in a locked position;

DETAILED DESCRIPTION

Throughout this detailed description a same number may be used to identify a same component that is used in more than one location or added to the number to more clearly describe a particular structural relationship of the component with another component.

Figure 1:
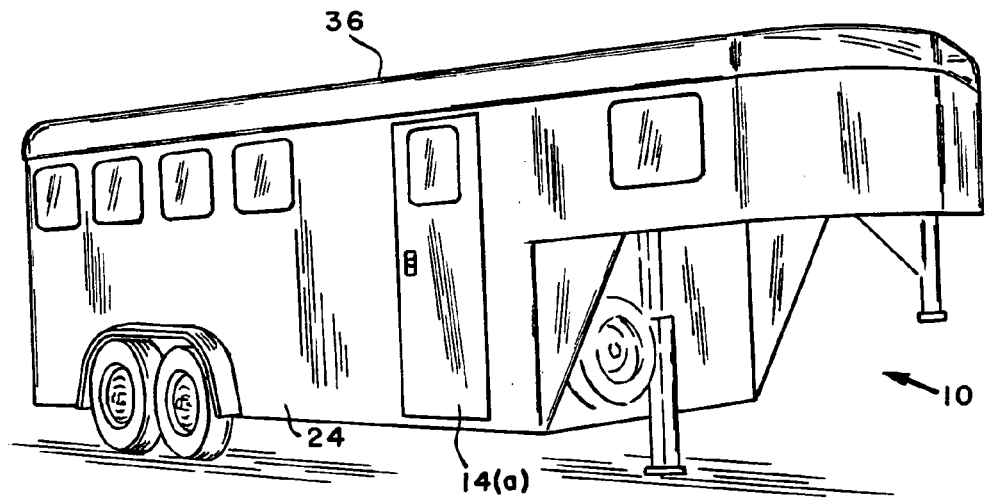
FIG. 1 is a perspective view of a trailer having an interior divided by into stalls in a manner according to the principals of the present invention.

FIG. 1 is an illustration of a trailer 10 that could include the present invention for transporting a plurality of animals between one location and another location. Trailer 10 is designed to be towed behind a truck and also includes space for equipment associated with the use and care of such animals, most often such animals are horses. According to the invention and further illustrated in FIGS. 2, 3 and 4, trailer 10 is designed so that an animal will enter onto the floor 20 through a rear door 12, be retained in a stall 26 and will exit through either a side door 14a located on side 24 or an identical side door 14b located on side 22 near the front to the trailer. It is not necessary for the animal to step backwards out of a stall 26 as a gate 16 in a plurality of gate assemblies 16,16" . . . 16n sequentially located with respect to side door 14b is rotated from a vertical position to a stored horizontal position adjacent the roof 36 of the trailer 10 to remove a barrier that separates a stall 26 from the side door 14b. In removing an animal from the trailer, the animal does not have to step backwards off a trailer through a rear door as an animal can see were it is stepping as it is moving forward out of the trailer through side door 14b.

In more particular detail, the trailer 10 is defined by an enclosed structure having a floor 20 with first 22 and second 24 sidewalls that extend therefrom with a roof 36 attached to the sidewalls. The rear door 12 is made up of a first section 12a and a second section 12b. The first section 12 is pivotally attached to the first side wall 22 and the second section 12b is pivotally attached to the second 24 side wall. The latch 13 for the rear door 12 is opened and portion 12b opened for an animal to step onto floor 20 as illustrated in FIG. 5. The floor 20 may thereafter be divided into a plurality of stalls 26,26' ... 26n by ramped gate assemblies 16,16" ... 16n which are moved from a stored horizontal location adjacent roof 36 to a vertical position with respect to floor 20. Each gate 16 in the plurality of gate assemblies 16,16" ... 16n is connected to a first rail assembly 7Q that is attached to the first side wall 22 and a second rail assembly 70' attached to the second side wall 24 as illustrated in FIG. 2.

Figure 2:
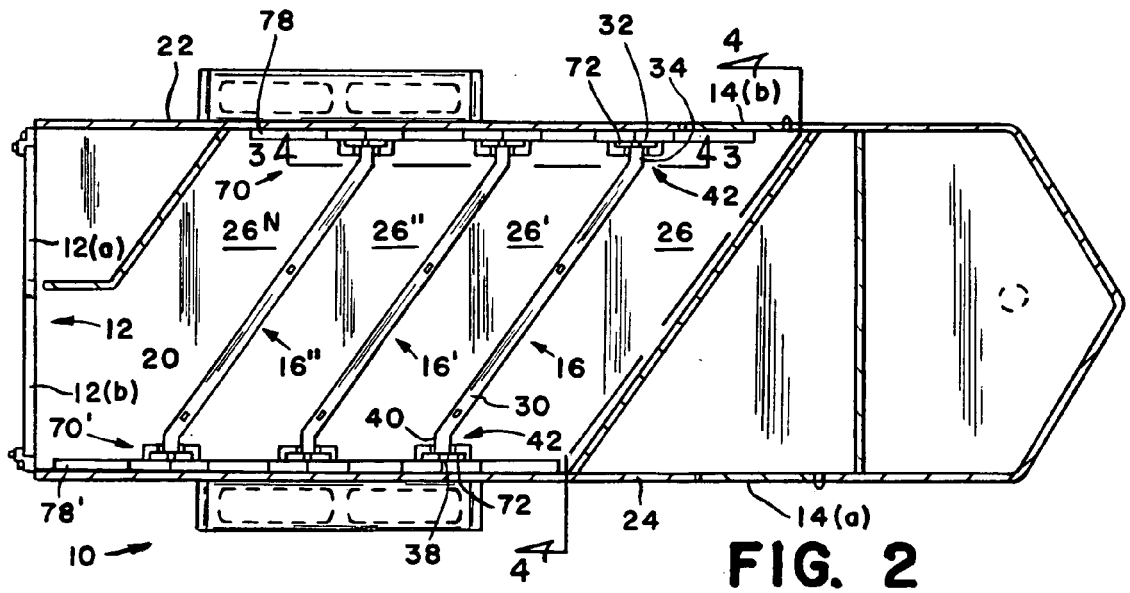
FIG. 2 is a top view of the trailer of FIG. 1 taken along lines 2—2.
Figures 9, 10:
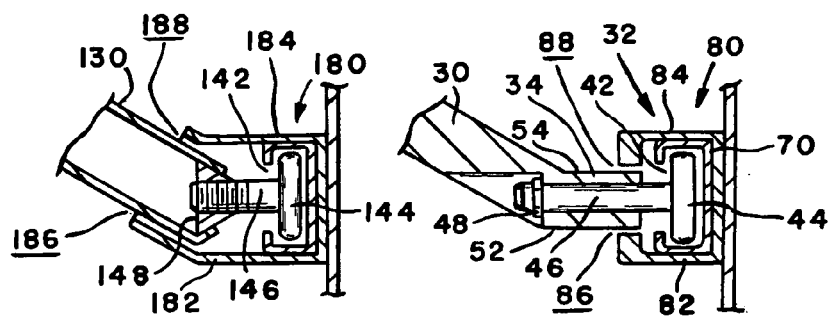
FIG. 9 is an enlarged view of a roller and rail arrangement for a gate.
FIG. 10 is an enlarged view of an alternate roller and rail arrangement.

Each gate 16 is the plurality of gate assemblies 16,16" ... 16n is defined by a rectangular frame 30, see FIGS. 2 and 4, with a first 32 and second 32' bearing located on a first side 34 and third 38 and fourth 38' bearing located on a second side 40. The first 32 and second 32' bearings extend from frame 30 and are located in perpendicular alignment with the first side wall 22 while the third 38 and fourth 38' bearings extend from frame 30 and are in a perpendicular alignment with the second wall 24. A roller 42, as illustrated in FIG. 9, has a cylindrical head 44 and a shaft 46. Shaft 46 for a roller 42 is respectively retained in each of the first 32, second 32', third 38 and fourth 38' bearing surfaces and retained therein by a snap ring 48 that is located in groove in the shaft 46 while the cylindrical head 44 is designed to be retained in one of the first 70 and second 70' rail assemblies. A first pad 50, see FIG. 4, is located along a first side 52 while a second pad 50' is located along a second side 54 of frame 30. Each pad 50,50' substantially extends the entire length of the frame 30 and covers any sharp exposed edges that may harm an animal that may come into contact with the rectangular frame 30. Frame 30 may be equipped with a locking mechanism 56,56' to retain the frame 30 in a fixed position with respect to the floor 20 or roof 36.

Locking mechanism 56,56' is best illustrated in FIGS. 7 and 8 and includes a first T-shaped plunger 58 retained in openings 59,59', a lever arrangement 63 pivotally attached to the frame 30 and a spring 61. Spring 61 acts on lever 63 to urge a projection 65 on the lever 63 toward plunger 58. A key or snap ring 53 is attached to plunger 58 to retain and limit the movement of the plunger 58 in an opening 17 in the continuous rail 78. A first locking mechanism 56 is located the first side 34 and a second locking mechanism 56' is located on the second side 40, see FIG. 4. In a retracted state, the T-shaped plungers 58,58' are moved such that key 53 engages a wall 30', see FIG. 7, and projection 65 on lever 63 engages plunger 58 such that a spring 61 is compressed and respective ends 75,75' respectively on plungers 58,58' are moved and held in a position that is equal to or less than a length between the first side 34 and the second side 40 to create a gap with respect to the first and second continuous rails 78,78'.

The structure of the first rail assembly 70 and the second rail assembly 70' are identical and located on opposite sides of the floor 20 with a first vertical section in each rail assembly being located at a different distance from the rear door 12 of the trailer 10. The specific structure of the first rail assembly 70, as best illustrated in FIGS. 3 and 9, and described herein equally apply the second rail assembly 70'.

The first rail assembly 70 is attached to the first side wall 22 and includes a plurality of vertical sections 72,72' ... 72n that are connected to a plurality of horizontal sections 74,74' ... 74n by splitter Y shaped splitters 76,76" ... 76n to define a continuous rail 78. A second rail assembly 70' is attached to the second wall 24 in a manner such that the first vertical section 72 of the first rail assembly 70 and the first vertical section of the second rail assembly 70' offset from each other with respect to rear door 12 to thereafter define a ramp relationship between the plurality of gate assemblies 16,16" ... 16n, as illustrated in FIG. 2. A first roller 42, of the type shown in FIG. 9, is located in the first bearing 32 on a first corner on the first side 34 and a second roller 42' is located in the second bearing 32' on a second corner on the first side 34 in each gate 16. The first roller 42 and second roller 42' are retained in one of vertical sections 72,72" ... 72n of the first rail assembly 70. Similarly, a third roller 42 is located in the third bearing 38 on a first corner on the second side 40 and a fourth roller 42 is located in the fourth bearing 38' on a second corner of the second side 40. The first roller 42 and second roller 42' on the second side 40 are retained in a corresponding vertical section of the vertical sections 72,72" ... 72n of the second rail assembly 70' attached to the second side wall 24 such that each gate 16 is located at a ramped angle with respect to the floor 20. The plurality of rollers 42 attached to the first 34 and second 40 sides of the rectangular frame 30 move in the continuous rails 78,78' as a gate 16 is moved between the horizontal and vertical positions. Each 16 gate in the gate assemblies 16,16" ... 16n has a vertical position where it is stored adjacent roof 36 and a horizontal position where it is perpendicular to the floor 20 to define on of the individual ramped stalls 26,26' ... 26n within the enclosed structure.

Each vertical section in the plurality of vertical sections 72,72" ... 72n of the continuous rails 78,78' are surrounded by a substantially U-shaped guide 80. Each guide 80, see FIGS. 3 and 9, has a base that is attached to the side wall of the trailer 10 and first 82 and second 84 arms that extend a distance from the base such that the first 34 and second 40 sides of frame are located between the first 82 and second 84 arms. A first gap 86 is defined between arm 82 and wall 52 of rectangular frame 30 and a second gap 88 is defined between arm 84 and wall 54 of rectangular frame 30. Gaps 86 and 88 have a sufficient dimension to allow rollers 42 to move within the continuous rails 78,78' without binding but are designed such that any lateral forces that may be applied to the rectangular frame 30 is carried into one of the arms 82 or 84 without introducing stress to a corresponding bearing 32.

A resilient bumper or block 81 is attached to the bottom of each U-shaped guide 80 and engages a rectangular frame 30 when the frame is in the vertical position to absorb noise.

For some applications, the roller 42 illustrated in FIG. 9 may be replaced by a roller 142 as illustrated in FIG. 10. Roller 142 is defined by a cylindrical head 144 that is retained on a shaft 146 that is screwed into a conical nut 148 located in a tubular section of the rectangular frame 130. Shaft 146 is stationary and cylindrical head 144 rolls on both shaft 146 the rail. It is also envisioned that the threaded section on shaft 146 could be smooth and the roller 142 retained in a bearing by a snap ring located in a groove in the shaft 146. When rollers 142,142' are attached to the rectangular frame 130, gaps 186 and 188 are defined between arms 182 and 184 of a U-shaped guide 180 and as a result the rectangular frame 130 may move within a rail without binding. However, any lateral forces that may be applied to the rectangular frame 130 are carried into a side wall and would not damage rollers 142,142'.

Frame 30 of each gate 16 has a substantially rectangular shape with a height of between 2 and 3 feet and a width greater that the width of floor 20. When a gate 16 is located in a vertical position there is a space of about 4 feet between the top of the gate and roof 36 and as a result an animal located in a stall 26 may easily turn its head and touch or contact an animal in an adjacent stall. In order to reduce contact and separation, a curtain 300 of a type illustrated in FIGS. 4 and 6 may be installed between the stalls 26. The curtain 300 has a top member 302 that is attached to roof 36 and a bottom member 304 that resiliently retains a roller. A clip 306 attached to the bottom member 304 is designed to be connected to loop 29 on the frame 30 to further separate one stall from another stall.

Method of Utilization of the Trailer

When an operator desired to transport a plurality of animals from one location to another, trailer 10 is connected to a tow vehicle and moved to a location to load animals. Section 12b of the rear door 12 is opened and at this time all of the gate assemblies 16,16" . . . 16n are stored in a horizontal position adjacent roof 36 as illustrated in FIG. 5. A ramp, not shown, is attached to floor 20 and an animal is led onto floor 20 to a position adjacent the front of the trailer 10. The T-shaped plungers 58,58' on the locking mechanisms 56 on the first gate 16 are moved such that ends are correspondingly moved out of openings 17,17' in the first and second continuous rails 78,78'. Thereafter, the first gate 16 is moved from the horizontal position to a vertical position in the first vertical sections 72 of the first and second continuous rails 78,78' to define a first stall 26 such that a ramped partition is created between walls 22 and wall 24. When the bottom of the frame 30 of the first gate engages the rubber bumpers 81 on guides 80, 80', the T-shaped plungers 58,58' are moved and projections 65,65' of levers 63,63' are resiliently urged into corresponding grooves 57,57' to retain ends 75,75' that are now located in openings 17,17' in a vertical section 72 of the continuous rails 78,78' to lock the first gate 16 in the vertical position. The bottom 304 of curtain 300 is pulled down from the roof 36 and clips 306 attached to loops 29 to complete the separation of stall 26 from the remaining space on floor 20. This process is repeated to create remaining stalls 26' . . . 26n to transport a desired number of animals.

When an operator arrives at a desired location, the side door 14b is opened and after attaching a ramp, not shown, to the floor 20, the operator steps onto the floor 20 through either side door 14a or 14b and after untying the animal from stall 26 would lead the animal out of the floor 20 through a side door 14a or 14b. The animal is always moving in a forward manner and can always see where it is stepping and a result does not become scared of getting off the trailer 10. After the animal is removed from a stall 26, an operator reenters the floor floor 20 and after moving the T-shaped plungers 58,58 of the locking mechanisms 56,56' in a subsequent gate 16 to a released position to respectively move ends 75,75' out of openings 17,17' in a vertical section 72, a force is applied to move this subsequent gate 16 from the vertical position to a horizontal position adjacent roof 36. T-shaped plungers 58,58 are moved such that ends 75,75' are now located in openings 19,19' in a horizontal section 74 of the continuous rails 78,78' to retain this gate 16 in a fixed position adjacent roof 36.

The Y-shaped splitters 76,76" . . . 76n allows a gate 16 to be stored in adjacent for and aft horizontal sections 74,74' in the continuous rails 78,78', which ever is easier and would not scare an animal through the movement of an object above its head. In any case, a subsequent stall 26' is opened to the side doors 14a and 14b and an animal after being untied from wall 22 is lead out of floor 20 by walking forward. This process of eliminating the stalls 26,26' . . . 26n continues until all of the animals are removed from the floor 20 and an interior created as illustrated in FIG. 5 with all of the gate assemblies 16,16" . . . 16n stored adjacent the roof 36.

In conclusion, by moving the gate assemblies 16,16" . . . 16n from a vertical position a stored horizontal positions, an animal may enter and exit the trailer 10 by always walking in a forward direction and as a result the animal is no subjected to stress associated with the backing of an animal off a trailer.

I claim:

1. A trailer for transporting a plurality of animals, said trailer having a floor with first and side walls that extend therefrom and a roof attached to the side walls to define an enclosed structure, said enclosed structure having a rear door for egress onto the floor and a forward door in at least one of said side walls, said floor being divided by a plurality of ramped gate assemblies, each gate in said plurality of gate assemblies is characterized by a rectangular frame having first and second bearing surfaces on a first side and third and fourth bearing surfaces on a second side, said first and second bearing surfaces being positioned to be in a perpendicular alignment with said first wall and said third and fourth bearing surfaces being positioned in a perpendicular alignment with said second wall, a plurality of roller means each having a head with a shaft respectively retained in one of said first, second, third and fourth bearing surfaces; a first rail assembly attached to said first side wall with a plurality of first vertical sections connected to a plurality of first horizontal sections by first splitter sections to define a first continuous rail member, a second rail assembly attached to said second side wall with a plurality of second vertical section connected to a plurality of second horizontal section by second splitter sections to define a second continuous rail member, said first and second vertical sections in said first and second continuous rail members being offset from each other with respect to rear door, said first and second rollers in each gate being retained in one of said first vertical sections of said first rail assembly and said third and fourth rollers on each gate being retained in one of said second vertical sections of said second rail assembly such that with said gate is located in a horizontal position to define a ramped individual stall within said enclosed structure, said each gate being moved from said horizontal position to a vertical position by said first and second rollers moving in said first continuous rail and said third and fourth rollers moving in said second continuous rail to a horizontal section to eliminate said individual ramped stall within said enclosed structure.

2. The trailer as recited in claim 1 wherein said gate assemblies include a number of said each gate to provide for the development of a corresponding number of individual stalls.

3. The trailer as recited in claim 2 wherein said each gate may be retained in either a forward or rear section of said horizontal section of said first and second continuous rail members such that access to an individual stall may be from either said rear or forward door.

4. A trailer for transporting a plurality of animals, said trailer having a floor first and second side walls that extend therefrom and a roof attached to the side walls to define an enclosed structure, said enclosed structure having a rear door for egress onto the floor and a forward door in at least one of said side walls, said floor being divided into a plurality of stalls by gate assemblies, said gate assemblies being characterized by a plurality of individual gates wherein each gate has a first end that is connected through a first roller arrangement retained in a first rail fixed to said first side wall and a second end that is connected through a second roller arrangement retained in a second rail fixed to said second side wall, said gate having a length betweem said first and second ends that is greater than a length between said first and second side walls such that said first roller arrangement is located in the first rail at greater distance from the rear door that said second roller arrangement in the second rail, said gate being movable from a horizontal position adjacent said roof to a vertical position with respect to said floor after an animal enters said enclosed structure through said rear door to create a corresponding individual ramped stall with respect to said first and second side walls for the animal and whereby each gate may thereafter be moved from said vertical position and returned to said horizontal position to eliminate said individual ramped stall so that the animal may exit from the enclosed structure through said forward door.

5. The trailer as recited in claim 4 wherein first and second rails are each further characterized by a first section that extends in a vertical plane with respect to said floor, a second section that located in a horizontal plane with respect to said roof and a third section that transitions from said first section to said second section, said first sections of said first and second rails being offset from each other to receive said first and second roller arrangements such that said first and second roller arrangements move in a plane parallel with said first section, third section and second sections on movement of said each gate between said horizontal and vertical positions.

6. The trailer as recited in claim 5 wherein first section of said first and second rails are further characterized by a guides respectively located adjacent said first sections, said each gate on receipt of a lateral force moving into engagement with a guide to limit the communication of said lateral force into said first and second roller arrangements of said each gate.

7. The trailer as recited in claim 6 wherein each roller of said first and second roller arrangements is characterized by a cylindrical head with a shaft extending therefrom, said shaft being retained in a bearing in said each gate such that said roller is in perpendicular alignment with respect to a corresponding rail.

8. The trailer as recited in claim 7 wherein said each gate is further characterized by locking means that engage said first and second rails to retain said each gate in either a horizontal or vertical position.

9. The trailer as recited in claim 6 wherein said guides are further characterized by resilient means on which a gate rests in a horizontal position to attenuate noise that may occur when a trailer is traveling on a rough road.

10. The trailer as recited in claim 4 wherein said each gate is further characterized by a curtain means attached to said roof and extendable therefrom to limit the visibility from said individual stall.

11. The trailer as recited in claim 10 wherein said third section of each rail has a forward and an aft branch such that said first section of each rail is connected to horizontal section of successive rails such that a gate may be moved in either a forward or aft direction when in a storage position.

* * * * *